(12) United States Patent
Sun et al.

(10) Patent No.: US 11,516,458 B2
(45) Date of Patent: Nov. 29, 2022

(54) DEVICE FOR STEREOSCOPIC DISPLAYING AND METHOD FOR CONTROLLING THE SAME

(71) Applicants: Beijing BOE Optoelectronics Technology Co., Ltd., Beijing (CN); BOE TECHNOLOGY GROUP CO., LTD., Beijing (CN)

(72) Inventors: Binhua Sun, Beijing (CN); Ziqiang Guo, Beijing (CN); Yakun Wang, Beijing (CN); Jiyang Shao, Beijing (CN); Feng Zi, Beijing (CN); Lin Lin, Beijing (CN); Yadong Ding, Beijing (CN); Bingxin Liu, Beijing (CN)

(73) Assignees: Beijing BOE Optoelectronics Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 3 days.

(21) Appl. No.: 17/263,980

(22) PCT Filed: Jul. 23, 2020

(86) PCT No.: PCT/CN2020/103721
§ 371 (c)(1),
(2) Date: Jan. 28, 2021

(87) PCT Pub. No.: WO2021/042898
PCT Pub. Date: Mar. 11, 2021

(65) Prior Publication Data
US 2021/0400253 A1 Dec. 23, 2021

(30) Foreign Application Priority Data
Sep. 2, 2019 (CN) .......................... 201910824900.0

(51) Int. Cl.
*H04N 13/302* (2018.01)
*G09G 3/00* (2006.01)
*H04N 13/398* (2018.01)

(52) U.S. Cl.
CPC .......... *H04N 13/302* (2018.05); *G09G 3/003* (2013.01); *H04N 13/398* (2018.05)

(58) Field of Classification Search
CPC .. H04N 13/302; H04N 13/398; H04N 13/393; G09G 3/003; G09G 3/005; G09G 3/008; G09G 2340/14; G09F 9/37
(Continued)

(56) References Cited

U.S. PATENT DOCUMENTS 5,202,675 A * 4/1993 Tokimoto ............... G09G 3/005
345/82
6,183,088 B1 2/2001 LoRe et al.
(Continued)

FOREIGN PATENT DOCUMENTS

CN 201945795 U 8/2011
CN 104575283 A 4/2015
(Continued)

OTHER PUBLICATIONS

First Office Action, including Search Report, for Chinese Patent Application No. 201910824900.0, dated Mar. 1, 2021, 39 pages.

*Primary Examiner* — Matthew K Kwan
(74) *Attorney, Agent, or Firm* — Westman, Champlin & Koehler, P.A.

(57) ABSTRACT

The present disclosure provides a device for stereoscopic displaying and a method for controlling the same. The device for stereoscopic displaying comprises: a rotary shaft and at least one display assembly. The display assembly is fixed to the rotary shaft, the display assembly comprises at least three display surfaces, and at least one of the display (Continued)

surfaces is arranged opposite to the rotary shaft in a radial direction of the rotary shaft.

14 Claims, 8 Drawing Sheets

(58) Field of Classification Search
USPC .......................................................... 348/51
See application file for complete search history.

(56) References Cited

U.S. PATENT DOCUMENTS

| | | |
|---|---|---|
| 6,969,174 B1 | 11/2005 | Radulescu |
| 10,645,377 B2 | 5/2020 | Ji |
| 2001/0048405 A1* | 12/2001 | Salley ..................... G09F 27/00 |
| | | 345/30 |
| 2002/0140631 A1* | 10/2002 | Blundell ................ G09G 3/005 |
| | | 348/E13.056 |
| 2012/0062988 A1* | 3/2012 | Watanabe ................ G09F 9/33 |
| | | 359/462 |
| 2018/0192043 A1* | 7/2018 | Ji ......................... H04N 13/393 |

FOREIGN PATENT DOCUMENTS

| | | | | |
|---|---|---|---|---|
| CN | 105068254 A | 11/2015 | | |
| CN | 106094412 A | 11/2016 | | |
| CN | 106773510 A | 5/2017 | | |
| CN | 108962112 A * | 12/2018 | ............ | G09F 9/377 |
| CN | 108962112 A | 12/2018 | | |
| CN | 110515213 A | 11/2019 | | |

* cited by examiner

DEVICE FOR STEREOSCOPIC DISPLAYING AND METHOD FOR CONTROLLING THE SAME

CROSS-REFERENCE TO RELATED APPLICATION(S)

This application is a Section 371 National Stage application of International Application No. PCT/CN2020/103721, filed on Jul. 23, 2020, which has not yet published, and claims priority to Chinese Patent Application No. 201910824900.0, filed on Sep. 2, 2019, the disclosures of which are incorporated herein by reference in their entireties.

TECHNICAL FIELD

The embodiments of the present disclosure relate to image displaying. Specifically, the embodiments of the present disclosure relate to a device for stereoscopic displaying and a method for controlling the same.

BACKGROUND 3D (Three dimensional) stereoscopic displaying technology may include parallax three dimensional displaying, hologram three dimensional displaying, and volumetric three dimensional displaying.

A device for volumetric three dimensional displaying may realize viewing an image with a stereoscopic effect by naked eyes. However, due to a limitation of spatial conditions, a number of voxels that may be generated by a single display assembly in a device for volumetric three dimensional displaying is relatively small, and display effect is poor.

SUMMARY

The present disclosure provides a device for stereoscopic displaying and a method for controlling the same.

According to a first aspect of the present disclosure, a device for stereoscopic displaying is provided, including a rotary shaft and at least one display assembly. The display assembly is fixed to the rotary shaft, the display assembly comprises at least three display surfaces, and at least one of the display surfaces is arranged opposite to the rotary shaft in a radial direction of the rotary shaft.

According to a second aspect of the present disclosure, a method for controlling the device for stereoscopic displaying of the embodiments of the present disclosure is provided, comprising: converting, by the information processing device, the Nth frame of three dimensional image data into the plurality of Nth frames of two dimensional image data, and storing, by the information processing device, the plurality of Nth frames of two dimensional image data in response to determining the display panel being in the preset phase according to the rotation angle information; determining, by the information processing device, the (N−1)th frame of two dimensional image data to be displayed for each display panel from stored the plurality of (N−1)th frames of two dimensional image data, and transmitting, by the information processing device, the (N−1)th frame of two dimensional image data to be displayed for each display panel; and receiving, by the display panel, the (N−1)th frame of two dimensional image data storing, by the display panel, the (N−1)th frame of two dimensional image data, and performing display, by the display panel, based on the stored (N−2)th frame of two dimensional image data, wherein N is a positive integer greater than 2.

According to the technical solutions provided by the embodiments of the present disclosure, in a case of a constant rotation speed, since the display assembly includes at least three display surfaces, and each display surface has a plurality of plane pixels, more voxels may be generated per unit time, thus increasing a number of frames of three dimensional images displayed per unit time, and promoting an enhancement of the display effect. When the number of voxels in a three dimension image remains unchanged, the rotation speed of the display assembly may be further increased, thus promoting an improvement of refresh rate, and further promoting an enhancement of the display effect. In addition, since a side surface parallel to a thickness direction of the display assembly is set as a display surface to display images, an original visual interference of the side surface to a user may be avoided, which may further enhance the display effect.

BRIEF DESCRIPTION OF THE ACCOMPANYING DRAWINGS

The above and/or additional aspects and advantages of the embodiments of the present disclosure may become obvious and easy to understand from the following description of the embodiments in conjunction with the accompanying drawings, in which.

DETAILED DESCRIPTION

Figure 1:
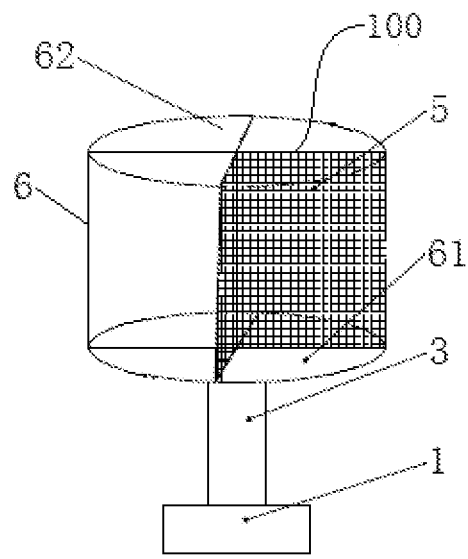
FIG. 1 shows a schematic structural diagram of a device for stereoscopic displaying provided by an embodiment of the present disclosure.

The embodiments of the present disclosure are described in details below. Examples of the embodiments of the present disclosure are shown in the accompanying drawings, wherein the same or similar reference numerals refer to the same or similar components or components with the same or similar functions throughout the text. In addition, if a detailed description of the known technology is unnecessary for the features of the illustrated embodiment of the present disclosure, the description will be omitted. The embodiments described below with reference to the accompanying drawings are exemplary, and are only used to explain the embodiments of the present disclosure, which should not be explained as limitations to the embodiments of the present disclosure.

Those skilled in the art may understand that, all terms used herein (including technical and scientific terms) have the meanings generally understood by those skilled in the art, unless otherwise defined. It should be noted that terms such as those defined in general dictionaries shall be interpreted to have meanings consistent with the context of the prior art, and shall not be interpreted in an idealized or too rigid way, unless specifically defined as here.

Those skilled in the art may understand that, singular forms "a", "an", "said" and "the" used herein may also include plural forms, unless specifically stated otherwise. It should be further understood that the term "comprising" and "including" used in the description of the embodiments of the present disclosure refers to a presence of the described features, integers, steps, operations, elements and/or components, but does not exclude a presence or addition of one or more other features, integers, steps, operations, elements, components, and/or groups thereof. The term "and/or" used herein includes all, any unit and all combinations of one or more associated listed items.

Figure 2:
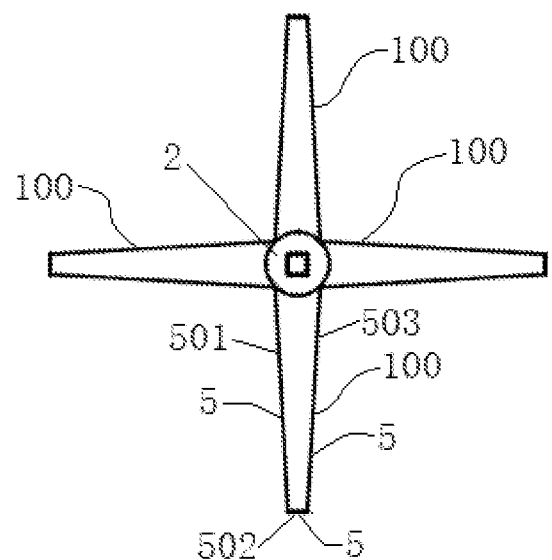
FIG. 2 shows a top view of a rotary shaft assembled with a plurality of display assemblies provided by an embodiment of the present disclosure.
Figure 3:
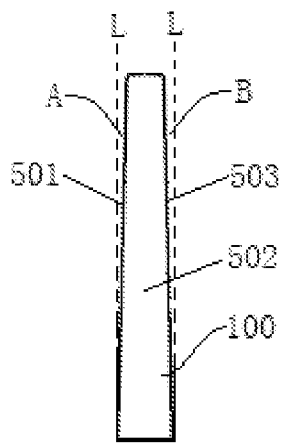
FIG. 3 shows a front view of a display assembly in FIG. 2 provided by an embodiment of the present disclosure.
Figure 4:
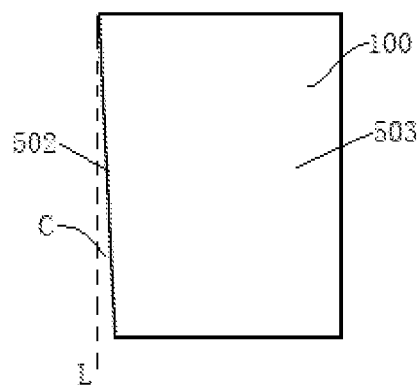
FIG. 4 shows a side view of a display assembly in FIG. 2 provided by an embodiment of the present disclosure.

The embodiments of the present disclosure provide a device for stereoscopic displaying. FIG. 1 shows a schematic structural diagram of a device for stereoscopic displaying provided by an embodiment of the present disclosure. FIG. 2 shows a top view of a rotary shaft assembled with a plurality of display assemblies provided by an embodiment of the present disclosure. FIG. 3 shows a front view of a display assembly in FIG. 2 provided by an embodiment of the present disclosure. FIG. 4 shows a side view of a display assembly in FIG. 2 provided by an embodiment of the present disclosure.

As shown in FIGS. 1 to 4, the device for stereoscopic displaying includes a rotary shaft 2 and at least one display assembly 100. The display assembly 100 is fixed to the rotary shaft 2, the display assembly 100 includes at least three display surfaces, and at least one of the display surfaces is arranged opposite to the rotary shaft 2 in a radial direction of the rotary shaft 2.

The display surface may be a first display surface 501, a second display surface 502, or a third display surface 503 in FIG. 2. As shown in FIG. 2, the second display surface 502 is arranged opposite to the rotary shaft 2 in a radial direction of the rotary shaft 2.

It should be noted that a three dimensional image is intended to be displayed in a spatial volume. The spatial volume may include a plurality of voxels, and several voxels may emit light to display a three dimensional image. In the embodiments of the present disclosure, a display surface is swept in a space when rotating to form a spatial volume, and each plane pixel in the display surface may be regarded as a voxel at each preset location. For example, the display surface passes through 10 preset locations during a rotation of 360 degrees, and each plane pixel may form 10 voxels. The display surface is configured to display a two dimensional image composed of a plurality of light emitting pixels. When reaching a certain preset location, each light emitting pixel in the display surface is regarded as a light emitting voxel. Since a device for stereoscopic displaying may be provided with at least one display assembly 100, and a display assembly 100 includes at least three display surfaces, a larger number of voxels are formed, and a plurality of light emitting voxels may construct a frame of three dimensional image.

It should be noted that in the embodiments of the present disclosure, a phase represents a rotation angle of a component. All display surfaces may be regarded as a component, and at least one specific angle (such as 90 degrees, 180 degrees, 270 degrees, and 360 degrees) and a specific display surface may be selected in advance. If the specific display surface is rotated to the specific angle, it is indicated that all the display surfaces have reached the preset phase, and it is further indicated that the display surfaces have reached the preset location. In a rotation period (rotation of 360 degrees), at least one preset phase may be set.

The rotary shaft 22 may drive the plurality of display assemblies 100 to rotate, and the plurality of display surfaces may display a frame of three dimensional image once a preset location is reached. If a display panel 55 rotates at a relatively high speed, a user may view a plurality of frames of three dimensional images during a visual stay time, thereby viewing images with a three dimensional effect. By using the device for stereoscopic displaying, the user may view an image having a three dimensional effect with naked eyes, i.e., without wearing 3D glasses. Moreover, a viewing distance and a viewing angle are not limited for the user, and the image may be viewed at any location in 360 degrees.

A display assembly 100 only is provided with one or two display surfaces, and the display surface is arranged in a direction vertical to a thickness direction of the display assembly 100. Therefore, without increasing the volume of the display assembly 100, it is difficult to increase an area of the display surface more, resulting in a small number of voxels being generated by a single display assembly 100, thereby affecting the display effect.

The inventor of the embodiments of the present disclosure found that for the display assembly 100 arranged on the rotary shaft 2, when the display assembly 100 passes through the user, a side surface of the display assembly 100 parallel to the thickness direction of the display assembly 100 is right in front of the sight of the user. If the side surface is configured as a display surface, the number of voxels generated by the display assembly 100 may be significantly increased, promoting an improvement of the display effect. The newly added display surface is arranged opposite to the rotary shaft 2 in a radial direction of the rotary shaft 2 in the device.

Under a premise of a constant rotation speed, since the display assembly 100 includes at least three display surfaces, and each display surface has a plurality of plane pixels, more voxels may be generated per unit time, increasing a number of frames of three dimensional images displayed per unit time, and promoting an enhancement of the display effect. Under a premise that the number of voxels in a three dimension image remains unchanged, the rotation speed of the display assembly 100 may be further increased, promoting an improvement of refresh rate, and further promoting an enhancement of the display effect.

In addition, in a device for stereoscopic displaying, since the side surface of the display assembly 100 parallel to the thickness direction is right in front of the sight of the user, and the side surface is not for displaying images, viewing experience of the user may be affected if the side surface appears in the vision field of the user. In the device for stereoscopic displaying in an embodiment of the present disclosure, since a side surface parallel to a thickness direction of the display assembly 100 is set as a display surface to display images, a visual interference of the side surface to a user may be avoided, which may further enhance the display effect.

For example, in the device for stereoscopic displaying provided by an embodiment of the present disclosure, as shown in FIG. 2, the at least three display surfaces include a first display surface 501, a second display surface 502, and a third display surface 503 coupled successively. The first display surface 501 and the third display surface 503 are coupled to the rotary shaft 2. The second display surface 502 is spaced from the rotary shaft 2 and is arranged opposite to the rotary shaft 2 in a radial direction of the rotary shaft 2.

The first display surface 501 and the third display surface 503 are substantially vertical to the thickness direction of the display assembly 100, and the second display surface 502 is substantially parallel to the thickness direction of the display assembly 100. For example, a clamp may be provided on the rotary shaft 22, and the display assembly 100 may be fixed on the rotary shaft 22 by the clamp.

For example, in the device for stereoscopic displaying provided by an embodiment of the present disclosure, as shown in FIG. 3, a first angle is formed between the first display surface 501 and the rotary shaft 2, a second angle is formed between the third display surface 503 and the rotary shaft 2, and at least one of the first angle and the second angle ranges from 0 to 10 degrees.

Taking FIG. 3 as an example, a dotted line L in FIG. 3 represents an axis of the rotary shaft 2, an angle A represents the angle between the first display surface 501 and the rotary shaft 2, and an angle B represents the angle between the third display surface 503 and the rotary shaft 2. It should be noted that the dotted line L is translated only for the purpose of clearly indicating the angle, and is not intended to indicate an actual location of the axis of the rotary shaft 2.

As shown in FIG. 3, the first display surface 501 and the third display surface 503 are deflected towards each other, so that the second display surface 502 is trapezoidal. For example, if the first angle equals to the second angle, the second display surface 502 is an isosceles trapezoid.

For example, in the device for stereoscopic displaying provided by an embodiment of the present disclosure, as shown in FIG. 4, a third angle is formed between the second display surface 502 and the rotary shaft 2, and the third angle ranges from 0 to 10 degrees.

As shown in FIG. 4, the dotted line L in FIG. 4 represents the axis of the rotary shaft 2, and an angle C represents the angle between the second display surface 502 and the rotary shaft 2. It should be noted that the dotted line L is translated only for the purpose of clearly indicating the angle, and is not an actual location of the axis of the rotary shaft 2.

In FIG. 4, since the second display surface 502 is deflected toward the rotary shaft 2, the third display surface 503 is trapezoidal, and the second display surface 502 is also trapezoidal.

In the device for stereoscopic displaying provided by an embodiment of the present disclosure, since the display surface is at an angle to the axial direction of the rotary shaft 2, a fan effect may be generated during the rotation of the display assembly 100, taking out heat generated by the display assembly 100 by a generated airflow. Thus, a temperature of the display assembly 100 may be reduced, so that the display assembly 100 maintains good performance.

For example, as shown in FIG. 1, the device for stereoscopic displaying provided by an embodiment of the present disclosure further includes a housing 6. The housing 6 surrounds on an outer side of the plurality of display assemblies 100. The housing 6 includes a first opening 61 and a second opening 62, and the first opening 61 and the second opening 62 are directly opposite to each other along the axial direction of the rotary shaft 22. The shell 6 may be made of transparent materials.

In FIG. 1, the housing 6 has a cylindrical shape with two ends open and with a predetermined length, and the first opening 61 and the second opening 62 are located at the two ends in the length direction of the housing 6 respectively.

A fan effect may be generated during the rotation of the display assembly 100. Air may flow into the housing 6 through the first opening 61, and may flow out of the housing 6 through the second opening 62, thus forming an airflow with a higher flow rate, and taking heat generated by the display assembly 100 out of the housing 6. Thus, the temperature of the display assembly 100 may be reduced, so that the display assembly 100 maintains good performance.

For example, in the device for stereoscopic displaying provided by an embodiment of the present disclosure, the display assembly 100 includes at least three display panels 5, and each of the at least three display panels 5 corresponds to the at least three display surfaces respectively.

Taking a lowermost display assembly 1001 in FIG. 2 as an example, the display panel 5A includes a first display surface 501, the display panel 5B includes a second display surface 502, and the display panel 5C includes a third display surface 503.

The number of display assemblies 100 in the device for stereoscopic displaying and the angle between two adjacent display assemblies 100 may be determined as desired. As shown in FIG. 2, the device for stereoscopic displaying provided by an embodiment of the present disclosure includes four display assemblies 100, and two adjacent display assemblies 100 form a 90-degree angle.

The number of display panels 5 in the display assembly 100 may be determined as desired. As shown in FIGS. 2 and 4, the display assemblies 1001, 1002, 1003, and 1004 each include three display panels. Taking the display assembly 1001 in FIG. 2 as an example, among the three display panels 5A, 5B, and 5C of the display assembly 1001, the display surface of the first display panel 5A and the display surface of the third display panel 5C are opposite to each other in the radial direction of the rotary shaft 2. The display surface of the third display panel 5C is adjacent to the display surface of the first display panel 5A and the display surface of the second display panel 5B respectively.

As shown in FIGS. 2 and 3, the display assembly 100 has a plate shape. The first display panel 5A and the second display panel 5B in FIG. 2 are arranged in an interval along the thickness direction of the display assembly 1001. The three display panels 5A, 5B, and 5C of the display assembly 1001 surround a U-shaped structure, and an opening of the U-shaped structure is right towards the peripheral surface of the rotary shaft 2. The display surface of the first display panel 5A and the display surface of the third display panel 5C are side surfaces of the display assembly 1001 substantially vertical to the thickness direction. The display surface of the second display panel 5B is a side surface of the display assembly 1001 substantially parallel to the thickness direction.

For example, the display assembly 100 includes a flexible display panel. The flexible display panel may be bent to form at least three display areas, and each display area corresponds to a display surface. For example, the flexible display panel is bent twice to form three display areas, and the three display areas correspond to the first display surface 501, the second display surface 502, and the third display surface 503, respectively.

Figure 6:
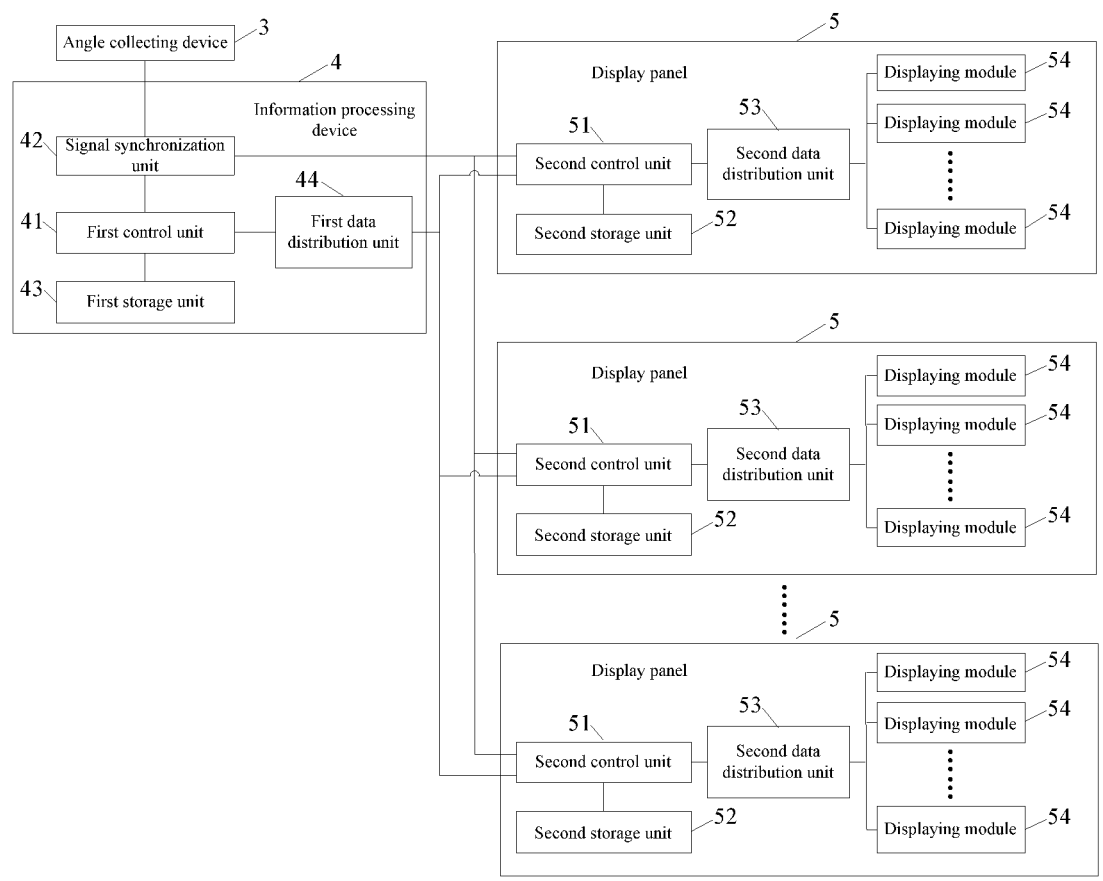
FIG. 6 shows a schematic diagram of a module of a control section in a device for stereoscopic displaying provided by an embodiment of the present disclosure.

For example, as shown in FIG. 1 and FIG. 6, the device for stereoscopic displaying according to the embodiment of the present disclosure further includes the following devices. A driving device 1 is coupled to the rotary shaft 2. An angle collecting device 3 is arranged on the rotary shaft 2 and detects rotation angle information of the rotary shaft 2. An information processing device 4 is electrically coupled to the angle acquiring device 3. The information processing device 4 is configured to, in response to determining the display panel 5 being in a preset phase according to the rotation angle information, convert a Nth frame of three dimensional image data into a plurality of Nth frames of two dimensional image data and store the plurality of Nth frames of two dimensional image data, and determine a (N−1)th frame of two dimensional image data to be displayed for each display panel 5 from the stored a plurality of (N−1)th frames of two dimensional image data.

The display panel 5 is electrically coupled to the information processing device 4 to receive and store the (N−1)th frame of two dimensional image data, and perform displaying based on a stored (N−2)th frame of two dimensional image data, wherein N is a positive integer greater than 2.

The driving device 1 drives the rotary shaft 2 to rotate, so that the rotary shaft 2 may drive a plurality of display assemblies to rotate, thereby causing the display panel 5 to rotate. A rotation angle of the rotary shaft 2 is same as a rotation angle of each display panel 5 in a same time period, thus detecting the rotation angle information of the rotary shaft 2 includes detecting the rotation angle information of each display panel 5. In an embodiment of the present disclosure, the information processing device 4 may determine that all the display panels 5 are in a preset phase once the rotary shaft 2 rotates through a preset angle (such as 10 degrees). For example, the preset angle may be any value from 0 to 360 degrees, and the specific value may be determined as desired.

The three dimensional image data is an original display signal, and a frame of three dimensional image data includes all display information of the frame of three dimensional image. The information processing device 4 is configured to convert a frame of three dimensional image into a plurality of two dimensional image data. A frame of two dimensional image data includes all display information of a frame of two dimensional image. Each display panel 5 displays a two dimensional image according to the corresponding two dimensional image data.

The number of frames of two dimensional image data converted from one frame of three dimensional image data may be determined according to a number of required display panels 5. In an embodiment of the present disclosure, the display assembly 100 includes 12 display panels 5, thus one frame of three dimensional image data may be converted into 12 two dimensional image data.

For example, in FIG. 1, the rotary shaft 2 is provided with an angle collecting device 3. The angle collecting device 3 may be an angle sensor or a shaft encoder.

For example, the driving device 1 is a motor, and an output shaft of the motor is coupled to the rotary shaft 2. Alternatively, the output shaft of the motor may be coupled to the rotary shaft 2 by using a speed reduction device.

For example, in the device for stereoscopic displaying provided by an embodiment of the present disclosure, as shown in FIG. 6, the information processing device 4 may include a first control unit 41, a signal synchronization unit 42 and a first storage unit 43.

The first control unit 41 is electrically coupled to the signal synchronization unit 42, the first storage unit 43, and the display panel 5, respectively.

The signal synchronization unit 42 is electrically coupled to the angle collecting device 3, and is configured to transmit a synchronization signal if it is determined that the display panel 5 is in the preset phase according to the rotation angle information.

The first control unit 41 is configured to, when receiving the synchronization signal, convert a Nth frame of three dimensional image data into a plurality of Nth frames of two dimensional image data and store the plurality of Nth frames of the two dimensional image data into the first storage unit 43, and determine a (N−1)th frame of two dimensional image data to be displayed for each display panel 5 from the stored a plurality of (N−1)th frames of two dimensional image data and transmit the (N−1)th frame of the two dimensional image data.

For example, in the device for stereoscopic displaying provided by an embodiment of the present disclosure, as shown in FIG. 6, the information processing device 4 further includes a first data distribution unit 44. An input terminal of the first data distribution unit 44 is electrically coupled to an output terminal of the first control unit 41, and an output terminal of the first data distribution unit 44 is electrically coupled to each display panel 5.

Those skilled in the art may understand that the first control unit 41, the signal synchronization unit 42, and the first data distribution unit 44 are all functional modules. All functions of the first control unit 41, the signal synchronization unit 42, and the first data distribution unit 44 may be realized by the information processing device 4.

The first control unit 41 transmits the plurality of (N−1)th frames of two dimensional image data stored in the first storage unit 43 to the first data distribution unit 44, so that the first data distribution unit 44 transmits each of the received (N−1)th frames of two dimensional image data to one of the plurality of display panels 5 according to a preset address correspondence relationship.

For example, in the device for stereoscopic displaying provided by an embodiment of the present disclosure, as shown in FIG. 6, the display panel 5 includes a second control unit 51, a second storage unit 52, and a light emitting unit. The light emitting unit includes a display surface. Those skilled in the art may understand that the second control unit 51 is a functional module. A function of the second control unit 51 may be realized by a processor.

The second control unit 51 is electrically coupled to the second storage unit 52, the light emitting unit, the first control unit 41 and the signal synchronization unit 42 respectively.

The second control unit 51 is configured to, when receiving the synchronization signal, receive the (N−1)th frame of two dimensional image, store the (N−1)th frame of two dimensional image data in the second storage unit 52, and transmit the (N−2)th frame of two dimensional image stored in the second storage unit 52 to the light emitting unit, so that the light emitting unit displays the (N−2)th frame of the two dimensional image data.

The signal synchronization unit 42 simultaneously transmits a synchronization signal to the first control unit 41 and the second control unit 51, when determining the display panel 5 being in the preset phase according to the rotation angle information. For example, the second control unit 51 is electrically coupled to the first control unit 41 via the first data distribution unit 44. For example, an input terminal of the second control unit 51 is electrically coupled to the output terminal of the first data distribution unit 44.

Figure 5:
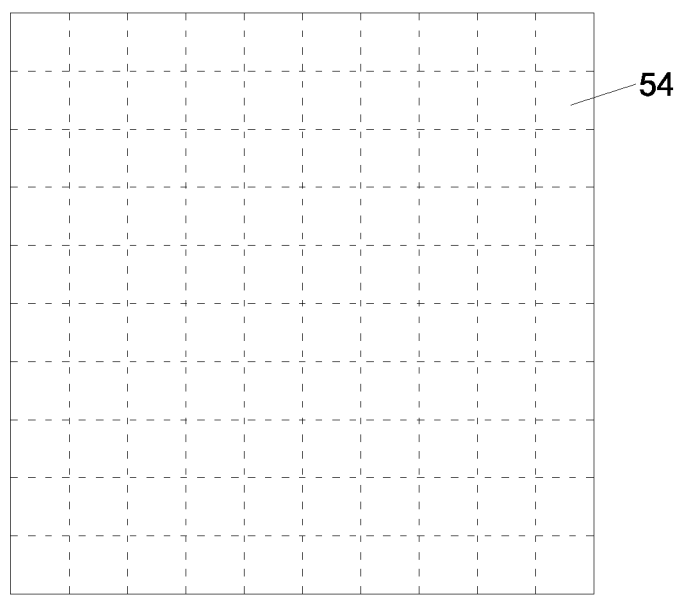
FIG. 5 shows a schematic diagram of a division of a displaying module in a display panel provided by an embodiment of the present disclosure.

For example, in the device for stereoscopic displaying provided by an embodiment of the present disclosure, as shown in FIGS. 5 and 6, the light emitting unit includes a plurality of display sub-units 54, and the second control unit 51 is electrically coupled to the plurality of display sub-units 54.

The first control unit 41 determines two dimensional sub-image data for each display sub-unit 54 of the display panel 5 based on a Nth frame of three dimensional sub-image data and stores the two dimensional sub-image data for each display sub-unit 54 of the display panel 5 in the first storage unit 43, and transmit a two dimensional sub-image data corresponding to the (N−1)th frame of three dimensional image data to the display panel 5 for each display sub-unit 54 to display.

The second control unit 51 receives the two dimensional sub-image data corresponding to the (N−1)th frame of three dimensional image data and stores the two dimensional sub-image data corresponding to the (N−1)th frame of three dimensional image data in the second storage unit, and transmit each (N−2)th frame of two dimensional sub-image data stored in the second storage unit 52 to a respective display sub-unit 54 in the light emitting unit.

Each display sub-unit 54 may be regarded as a plane pixel of the display panel 5, and a two dimensional image is consist of a plurality of light emitting display sub-units 54. A frame of two dimensional sub-image data includes display information of a display sub-unit 54. The two dimensional sub-image data may include information of the display sub-unit 54, such as a light emitting brightness, a light emitting duration, and a light emitting color. Those skilled in the art may understand that the light emitting brightness includes zero brightness, i.e., the display sub-unit 54 does not emit light.

In the device for stereoscopic displaying provided by an embodiment of the present disclosure, the closer to the rotary shaft 2, the greater a density of the display sub-units 54. If all the display sub-units 54 have a same light emitting brightness, from a user perspective, perceived brightness of an area close to the rotary shaft 2 is greater than perceived brightness of an area away from the rotary shaft 2, causing the user to perceive uneven brightness of the three dimensional image.

According to an embodiment of the present disclosure, the light emitting brightness of each display sub-unit 54 may be adjusted independently. Therefore, the light emitting brightness of the display sub-units 54 may be set so that the closer a display sub-unit 54 to the rotary shaft 2, the lower the light emitting brightness. In this manner, the light emitting brightness of the display sub-units 54 in each area perceived by the user are approximately the same, reducing the degree of uneven brightness in the three dimensional image, and improving viewing experience of the user.

The number of two dimensional sub-image data divided by the two dimensional image data may be determined according to the number of required display sub-units 54. For example, a display panel 5 includes 100 display sub-units 54, thus a frame of two dimensional image data may be converted into 100 frames of two dimensional sub-image data.

For example, in the device for stereoscopic displaying provided by an embodiment of the present disclosure, the display panel 5 further includes a second data distribution unit 53. An input terminal of the second data distribution unit 53 is electrically coupled to an output terminal of the second control unit 51, and an output terminal of the second data distribution unit 53 is electrically coupled to an input terminal of each display sub-unit 54 in the light emitting unit.

The second control unit 51 transmits each (N−2)th frame of two dimensional sub-image data stored in the second storage unit 52 to the second data distribution unit 53, so that the second data distribution unit 53 transmits each of the received frames of two dimensional sub-image data to a respective display sub-unit 54 according to a preset address correspondence relationship.

Figure 7:
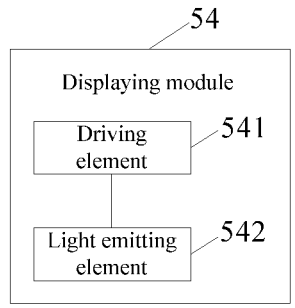
FIG. 7 shows a schematic structural diagram of a displaying module provided by an embodiment of the present disclosure.

For example, as shown in FIG. 7, the display sub-unit 54 includes a driving element 541 and a light emitting element 542. An input terminal of the driving element 541 is electrically coupled to an output terminal of the second data distribution unit 53, and an output terminal of the driving element 541 is electrically coupled to the light emitting element 542. The driving element 541 receives the two dimensional sub-image data, and drives the light emitting element 542 to emit light with a preset brightness. It should be noted that if the light emitting brightness in the two dimensional sub-image data is zero, the driving element 541 drives the light emitting element 542 to stop emitting light.

In the device for stereoscopic displaying provided by an embodiment of the present disclosure, in the preset phase, the information processing device 4 processes the Nth frame of three dimensional image data, and the display assembly 100 displays the image corresponding to the (N−2)th frame of three dimensional image data. Therefore, data processing and image displaying are performed at a same time, avoiding a start time of the image displaying from being affected by data processing, ensuring each frame of three dimensional image being displayed smoothly and successively, preventing delays, and improving the display effect.

Figure 8A:
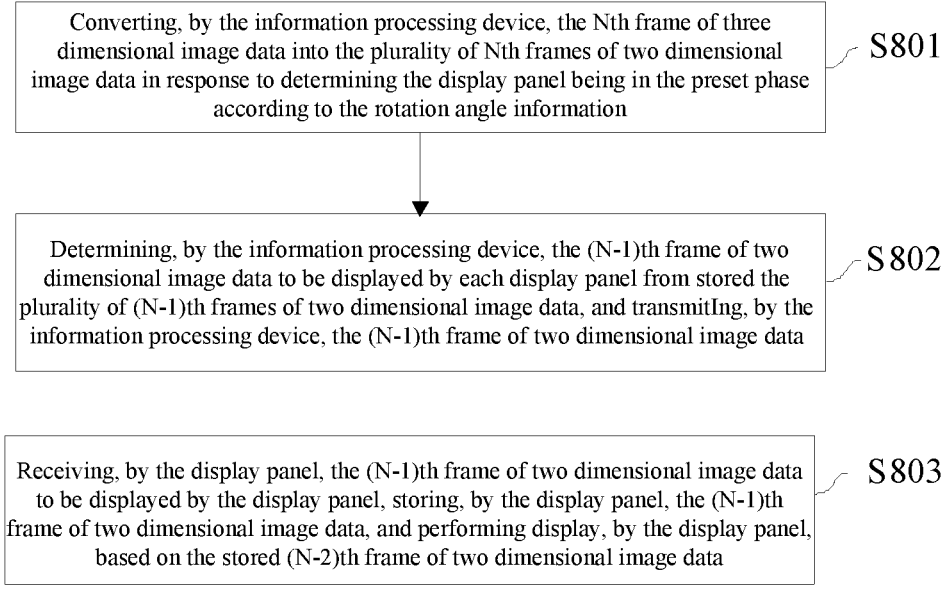
FIG. 8A shows a flowchart of a method for controlling the device for stereoscopic displaying provided by an embodiment of the present disclosure.

The embodiment of the present disclosure also provides a method for controlling the device for stereoscopic displaying provided by an embodiment of the present disclosure. As shown in FIG. 8A, the control method may include the following steps.

In step S801, the Nth frame of three dimensional image data is converted into the plurality of Nth frames of two dimensional image data by the information processing device, in response to determining the display panel being in the preset phase according to the rotation angle information.

In step S802, the (N−1)th frame of two dimensional image data to be displayed by each display panel 5 is determined by the information processing device from stored the plurality of (N−1)th frames of two dimensional image data, and the (N−1)th frame of two dimensional image data to be displayed by each display panel 5 is transmitted by the information processing device.

In step S803, the (N−1)th frame of two dimensional image data to be displayed by the display panel 5 is received by the display panel 5, the (N−1)th frame of two dimensional image data is stored by the display panel, and display is performed by the display panel, based on the stored (N−2)th frame of two dimensional image data, wherein N is a positive integer greater than 2.

For example, when determining the display panel 5 being in the preset phase according to the rotation angle information, the signal synchronization unit 42 of the information processing device 4 transmits a synchronization signal. When receiving the synchronization signal, the first control unit 41 of the information processing device 4 converts the Nth frame of three dimensional image data into a plurality of two dimensional image data and stores the plurality of two dimensional image data. For example, the plurality of two dimensional image data may be stored in the first storage unit 43 of the information processing device 4.

Determining the two dimensional image data to be displayed for each display panel 5 from the stored a plurality of (N−1)th frames of two dimensional image data and transmitting the two dimensional image data includes: the two dimensional image data to be displayed for each display panel 5 is determined from a plurality of two dimensional image data corresponding to the (N−1) frame of three dimensional image data stored in the first storage unit 43, and the two dimensional image data is transmitted to be displayed for each display panel 5.

For example, the display panel 5 receiving and storing the two dimensional image data to be displayed on the display panel 5 corresponding to the (N−1)th frame of three dimensional image data, includes: the second control unit 51 of the display panel 5, when receiving the synchronization signal, receives the two dimensional image data to be displayed on the display panel 5 corresponding to the N-th frame of three dimensional image data, and stores the two dimensional image data in the second storage unit 52 of the display panel 5.

Displaying the two dimensional image data corresponding to the stored (N−2)th frame of three dimensional image data includes: the two dimensional image data corresponding to the (N−2)th frame of three dimensional image data stored in the second storage unit 52 is transmitted to the light emitting unit of the panel 5, so that the light emitting unit performs displaying.

For example, before determining the display panel 5 being in the preset phase according to the rotation angle information, the information processing device 4 further determines whether the rotation speed of the driving device 1 is within a preset speed range or not according to the rotation angle information. If the rotation speed of the driving device 1 is within the preset speed range, it is indicated that the rotation speed of the driving device 1 is stable. On a premise that the rotation speed of the driving device 1 is stable, the information processing device 4 starts to convert the three dimensional image data into the plurality of two dimensional image data.

For example, the first control unit 41 receives the rotation angle information, and determines the rotation speed of the driving device 1 being within the preset speed range according to the rotation angle information.

Figure 8B:
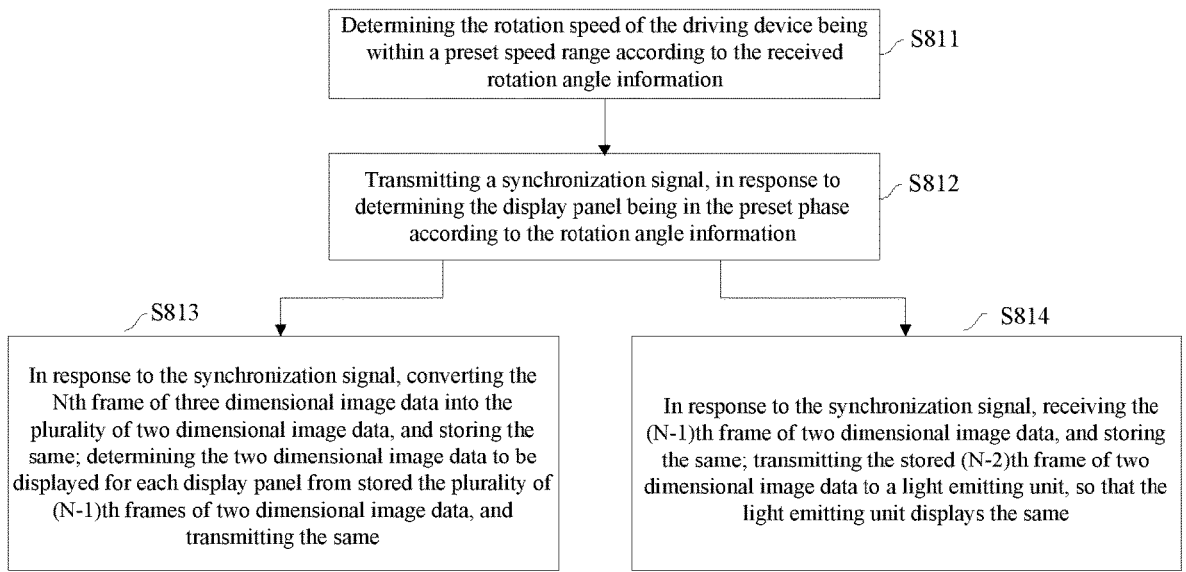
FIG. 8B shows a flowchart of another method for controlling the device for stereoscopic displaying provided by an embodiment of the present disclosure.
Figure 9:
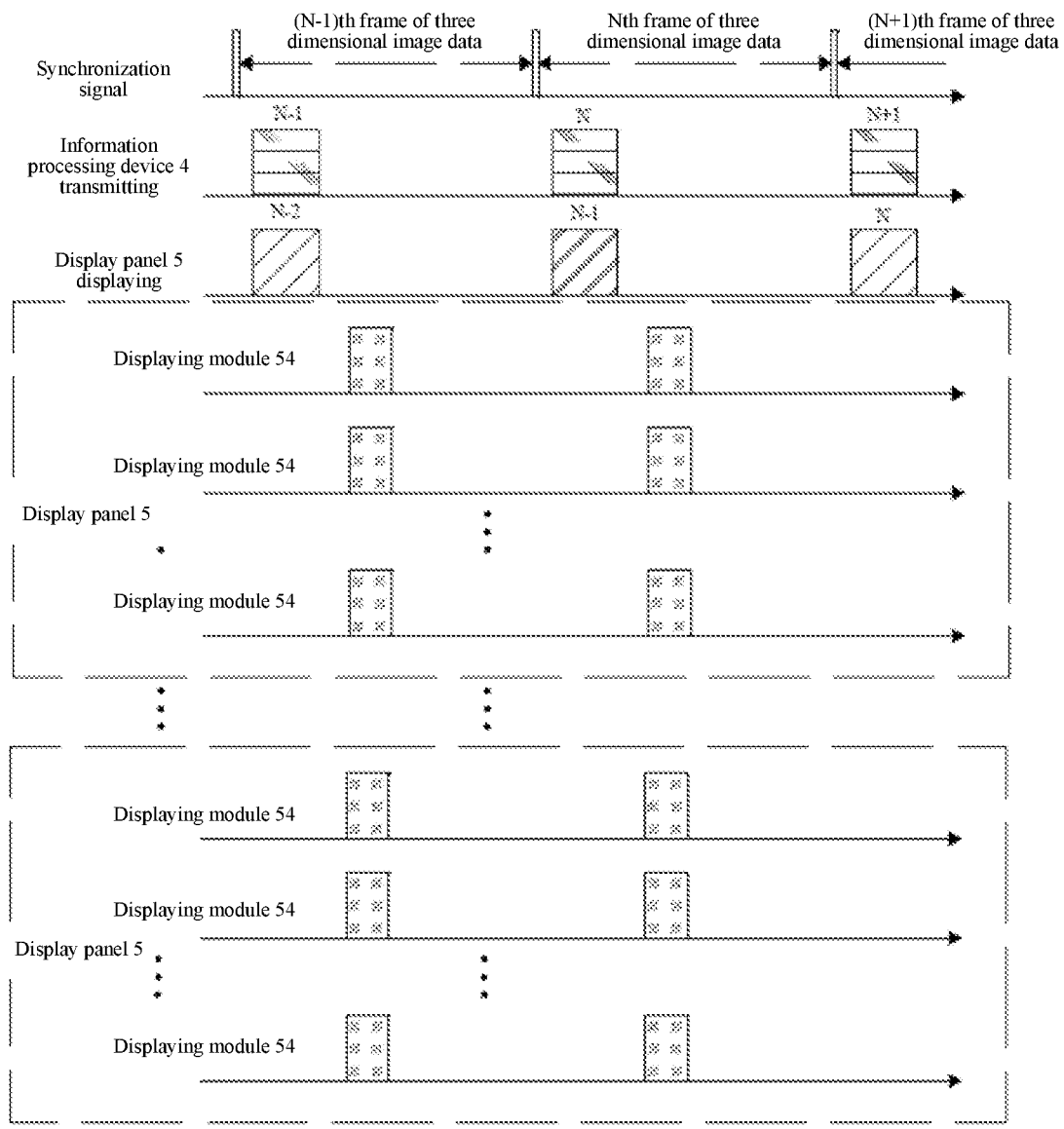
FIG. 9 shows a timing diagram of processing three dimensional image data in a method for controlling a device for stereoscopic displaying according to an embodiment of the present disclosure.

The embodiment of the present disclosure further provides an exemplary control method of a device for stereoscopic displaying. A schematic flowchart of the method is shown in FIG. 8B, and a timing diagram of processing three dimensional image data in the method is shown in FIG. 9. The method includes the following steps.

In S811, the rotation speed of the driving device 1 being within a preset speed range is determined by the first control unit 41 according to the received rotation angle information.

In S812, a synchronization signal is transmitted, in response to determining the display panel 5 being in the preset phase according to the rotation angle information.

In S813, in response to the synchronization signal, the Nth frame of three dimensional image data is converted into the plurality of the two dimensional image data by the first control unit 41, and the plurality of two dimensional image data is stored by the first control unit 41. The two dimensional image data to be displayed for each display panel is determined from the stored the plurality of (N−1)th frames of two dimensional image data, and the (N−1)th frame of two dimensional image data to be displayed for each display panel is transmitted.

In S814, in response to the synchronization signal, the (N−1)th frame of two dimensional image data is received by the second control unit 51, and the (N−1)th frame of two dimensional image data is stored by the second control unit 51. The stored (N−2)th frame of two dimensional image data is transmitted to a light emitting unit so that the light emitting unit displays the (N−2)th frame of two dimensional image data.

For example, there is no strict performing order between steps S813 and S814, and S813 and S814 may be performed simultaneously, or one may be performed before the other.

If the display panel 5 is in a next preset phase, the value of N is accumulated by 1, and steps S812 and S813 are continued to be performed.

Figure 10:
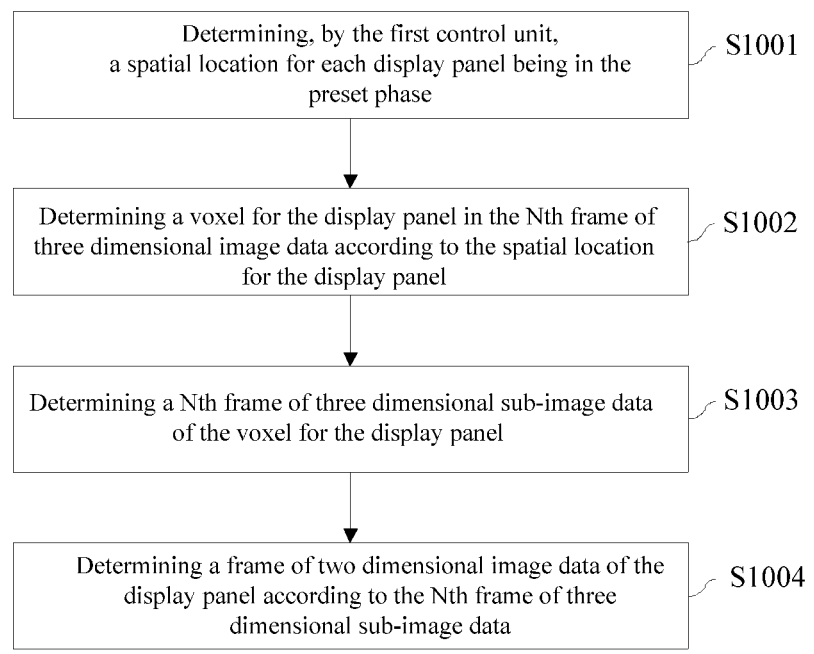
FIG. 10 shows a flowchart of an exemplary implementation method of step S813 provided by an embodiment of the present disclosure.

For example, a flowchart of an exemplary implementation method of step S813 is shown in FIG. 10, and may include the following steps.

In S1001, a spatial location for each display panel 5 being in the preset phase is determined by the first control unit 41.

In S1002, a voxel for the display panel 5 in the Nth frame of three dimensional image data is determined according to the spatial location for the display panel 5.

In S1003, a Nth frame of three dimensional sub-image data of the voxel for the display panel 5 is determined.

In S1004, a frame of two dimensional image data of the display panel 5 is determined according to the Nth frame of three dimensional sub-image data.

For example, step S1004 may further include: determining, by the first control unit 41, a frame of two dimensional sub-image data of each display sub-unit 54 of the display panel 5 according to the Nth frame of three dimensional sub-image data, and storing the frame of two dimensional sub-image data of each display sub-unit 54 of the display panel 5 in the first storage unit 43.

In step S813, the (N−1)th frame of two dimensional sub-image data to be displayed for each display sub-unit 54 of each display panel 5 is determined by the first control unit 41 from the plurality of (N−1)th frames of two dimensional image data stored in the first storage unit 43, and the (N−1)th frame of two dimensional sub-image data is transmitted to a respective display panel 5. Each two dimensional sub-image data has been stored in the first storage unit 43.

For example, in step S813, the first control unit 41 transmits a plurality of two dimensional image data corresponding to the (N−1)th frame of three dimensional image data stored in the first storage unit 43 to the first data distribution unit 44. The first data distribution unit 44 transmits each received two dimensional image data to a respective display panel 5 according to the preset address correspondence relationship.

For example, the first control unit 41 transmits the (N−1)th frame of two dimensional sub-image data to be displayed by each display sub-unit 54 in each display panel 5 to the first data distribution unit 44. Therefore the first data distribution unit 44 may transmit the received two dimensional sub-image data to a respective display panel 5 according to the preset address correspondence relationship.

For example, the driving element 541 of the display sub-unit 54 receives the two dimensional sub-image data, and drives the light emitting element 542 to emit light with a preset brightness. It should be noted that if light emitting brightness in the two dimensional sub-image data is zero, the driving element 541 drives the light emitting element 542 to stop emitting light.

For example, in step S813, in the case of receiving the synchronization signal, the second control unit 51 of the display panel 5 receives the (N−1)th frame of two dimensional image data to be displayed on the display panel 5 and stores the (N−1)th frame of two dimensional image data in the second storage unit 52 of the display panel 5.

For example, the second control unit 51 receives the (N−1) frame of two dimensional sub-image data to be displayed by each display sub-unit 54 of each display panel 5, and stores the (N−1) frame of two dimensional sub-image data in the second storage unit 52.

In step S813, the (N−2)th frame of two dimensional image data stored in the second storage unit 52 is transmitted to the light emitting unit of the display panel 5, so that the light emitting unit performs display.

For example, the second control unit 51 transmits each (N−2)th frame of two dimensional sub-image data stored in the second storage unit 52 to a respective display sub-unit 54 in the light emitting unit.

The second control unit 51 transmits each (N−2)th frame of two dimensional sub-image data stored in the second storage unit 52 to the second data distribution unit 53 so that the second data distribution unit 53 may transmit each received two dimensional sub-image data to a respective display sub-unit 54 according to the preset address correspondence relationship.

The second data distributing unit 53 transmits each received two dimensional sub-image data to a driving element 541 of a respective display sub-unit 54 according to the preset address correspondence relationship, and the driving element 541 drives the light emitting element 542 to emit light with a preset brightness.

Those skilled in the art may understand that steps, measures, and solutions of various operations, methods and processes that have been discussed in the embodiments of the present disclosure may be alternated, changed, combined, or deleted. Other steps, measures, and solutions of various operations, methods and processes that have been discussed in the embodiments of the present disclosure may further be alternated, changed, rearranged, decomposed, combined or deleted. Steps, measures, and solutions of various operations, methods and processes in the prior art that are similar to those discussed in the embodiments of the present disclosure may further be alternated, changed, rearranged, decomposed, combined or deleted.

The terms "first" and "second" are only used for descriptive purposes, and should not be understood as indicating or implying relative importance or implicitly indicating the number of indicated technical features. Thus, the features defined with "first" and "second" may explicitly or implicitly include one or more of these features. In the description of the present disclosure, unless otherwise specified, "plurality" means two or more.

It should be understood that although the various steps in the flowchart of the drawings are displayed in sequence according to the instructions of the arrows, these steps are not necessarily executed in the order indicated by the arrows. Unless explicitly stated in this article, there is no strict order for the execution of these steps, and the steps may be executed in other orders. Moreover, at least part of the steps in the flowchart of the drawings may include a plurality of sub-steps or a plurality of stages. The sub-steps or stages are not necessarily executed at the same time, and the sub-steps or stages may be executed at different times, and the order of execution is not necessary to be sequentially, but may be performed alternately or alternately with at least a part of other steps or sub-steps or stages of other steps.

The above are only part of the implementation of the embodiments of the present disclosure. It should be noted that for those of ordinary skill in the art, without departing from the principle of the embodiments of the present disclosure, several improvements and modifications may be made. These Improvements and modifications should also be regarded as the protection scope of the embodiments of the present disclosure.

We claim:

1. A device for stereoscopic displaying, comprising:
a rotary shaft;
at least one display assembly, fixed to the rotary shaft;
a display assembly driving device coupled to the rotary shaft;
an angle acquiring device, configured to detect rotation angle information of the rotary shaft; and
an information processing device, electrically coupled to the angle acquiring device,
wherein each of the at least one display assembly comprises at least three display surfaces, and at least one of the display surfaces is arranged opposite to the rotary shaft in a radial direction of the rotary shaft,
the display assembly comprises at least three display panels, and each of the at least three display panels comprises one of the at least three display surfaces respectively, the at least three display surfaces comprise a first display surface, a second display surface, and a third display surface coupled successively, wherein the first display surface and the third display surface are coupled to the rotary shaft; and the second display surface is spaced from the rotary shaft and is arranged opposite to the rotary shaft in a radial direction of the rotary shaft,
the information processing device is configured to:
in response to determining the display panel being in a preset phase according to the rotation angle information, convert a three dimensional image data of frame N into a plurality of two dimensional image data of frame N and store the plurality of two dimensional image data of frame N, and determine a two dimensional image data of frame N−1 to be displayed for each display panel from stored a plurality of two dimensional image data of frame N−1;
wherein the display panel is configured to receive and store the two dimensional image data of frame N−1, and perform display based on a stored two dimensional image data of frame N−2, wherein N is a positive integer greater than 2.

2. The device for stereoscopic displaying of claim 1, wherein a first angle is formed between the first display surface and the rotary shaft, a second angle is formed between the third display surface and the rotary shaft, and at least one of the first angle and the second angle ranges from 0 to 10 degrees.

3. The device for stereoscopic displaying of claim 1, wherein a third angle is formed between the second display surface and the rotary shaft, and the third angle ranges from 0 to 10 degrees.

4. The device for stereoscopic displaying of claim 1, wherein the information processing device is further configured to:
transmit a synchronization signal, in response to determining the display panel being in the preset phase according to the rotation angle information.

5. The device for stereoscopic displaying of claim 4, wherein the display panel comprises:
   a control unit, a storage unit and a light emitting unit;
   wherein, the control unit is configured to, in response to receiving the synchronization signal, receive the two dimensional image of frame N−1, store the two dimensional image data of frame N−1 in the storage unit, and transmit the two dimensional image of frame N−2 stored in the storage unit to the light emitting unit, so that the light emitting unit displays the two dimensional image data of frame N−2.

6. The device for stereoscopic displaying of claim 5, wherein the light emitting unit comprises a plurality of display sub-units;
   wherein, the information processing device is further configured to, for the plurality of display sub-units, divide the two dimensional image data of frame N−1 into a plurality of two dimensional sub-image data of frame N−1, and transmit the plurality of two dimensional sub-image data of frame N−1 to the display panel; and
   wherein, the control unit is configured to receive the plurality of two dimensional sub-image data of frame N−1, store the plurality of two dimensional sub-image data of frame N−1 in the storage unit, and transmit a plurality of two dimensional sub-image data of frame N−2 stored in the storage unit to the plurality of display sub-units to display the plurality of two dimensional sub-image data of frame N−2.

7. The device for stereoscopic displaying of claim 1, further comprising:
   a housing, disposed on an outer side of the plurality of at least one display assembly, comprising a first opening and a second opening, wherein the first opening and the second opening are aligned along an axial direction of the rotary shaft.

8. A method for controlling the device for stereoscopic displaying of claim 1, comprising:
   converting, by the information processing device, the three dimensional image data of frame N into the plurality of two dimensional image data of frame N, in response to determining the display panel being in the preset phase according to the rotation angle information;
   determining, by the information processing device, the two dimensional image data of frame N−1 to be displayed for each display panel from stored the plurality of two dimensional image data of frame N−1, and transmitting, by the information processing device, the two dimensional image data of frame N−1 to be displayed for each display panel; and
   receiving, by the display panel, the two dimensional image data of frame N−1, storing, by the display panel, the two dimensional image data of frame N−1, and performing display, by the display panel, based on the stored two dimensional image data of frame N−2, wherein N is a positive integer greater than 2.

9. The method of claim 8, further comprising:
   in response to determining the display panel being in the preset phase according to the rotation angle information, transmitting a synchronization signal by the information processing device, and converting, by the information processing device, the three dimensional image data of frame N into a plurality of two dimensional image data.

10. The method of claim 9, wherein the converting the Nth frame of three dimensional image data of frame N into a plurality of two dimensional image data comprises:
    determining a spatial location for each display panel being in the preset phase;
    determining a voxel for each display panel from the three dimensional image data of frame N according to the spatial location for each display panel;
    determining a three dimensional sub-image data of frame N from the voxel; and
    determining a Nth frame of two dimensional image data of frame N of the display panel according to the three dimensional sub-image data of frame N.

11. The method of claim 10, wherein the determining a two dimensional image data of frame N of the display panel according to the three dimensional sub-image data of frame N comprises:
    determining a two dimensional sub-image data of frame N for each display sub-unit according to the three dimensional sub-image data of frame N.

12. The method of claim 8, wherein in response to receiving the synchronization signal, a control unit of the display panel receives the two dimensional image data of frame N−1, and stores the two dimensional image data of frame N−2 in a storage unit; and
    the control unit of the display panel transmits the two dimensional image data of frame N−2 stored in the storage unit to a light emitting unit so that the light emitting unit displays the two dimensional image data of frame N−2.

13. The method of claim 12, wherein the receiving the two dimensional image data of frame N−1, and storing the two dimensional image data of frame N−1 in a storage unit comprises:
    receiving a two dimensional sub-image data of frame N−1 and storing the two dimensional sub-image data of frame N−1 in the storage unit.

14. The method of claim 12, wherein the transmitting the two dimensional image data of frame N−2 stored in the storage unit to a light emitting unit comprises:
    transmitting each two dimensional sub-image data of frame N−2 stored in the storage unit to a respective displaying module in the light emitting unit.

* * * * *